Jan. 29, 1946.  O. JENSEN  2,393,687
MOTOR-OPERATED CIRCUIT BREAKER
Filed Aug. 12, 1941  4 Sheets-Sheet 1
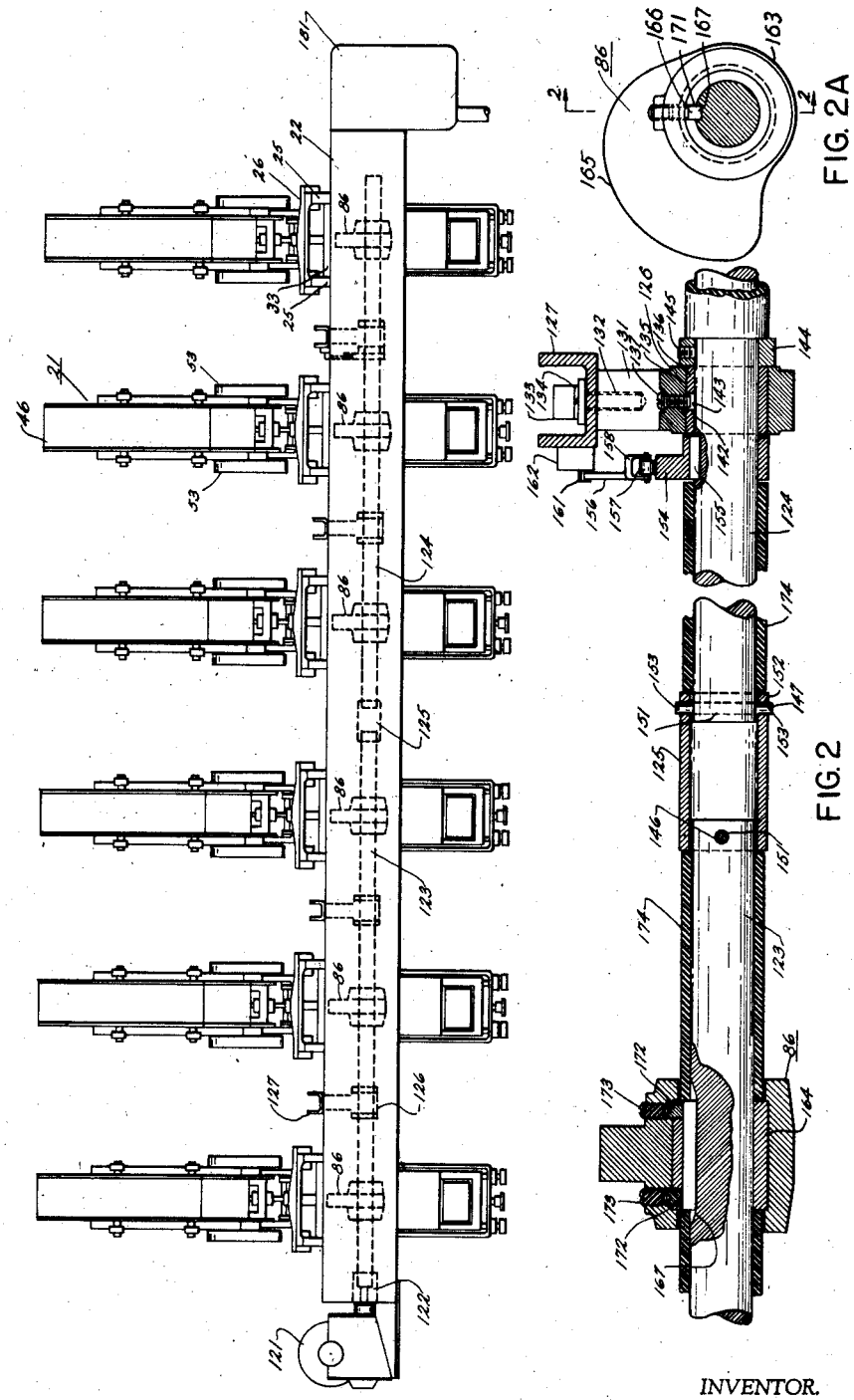
INVENTOR.
Otto Jensen
BY
ATTORNEY.

Jan. 29, 1946.  O. JENSEN  2,393,687
MOTOR-OPERATED CIRCUIT BREAKER
Filed Aug. 12, 1941  4 Sheets-Sheet 2

INVENTOR.
Otto Jensen
BY
ATTORNEY.

Jan. 29, 1946.    O. JENSEN    2,393,687
MOTOR-OPERATED CIRCUIT BREAKER
Filed Aug. 12, 1941    4 Sheets-Sheet 3

INVENTOR.
Otto Jensen
BY
Samuel Ostrolenk
ATTORNEY.

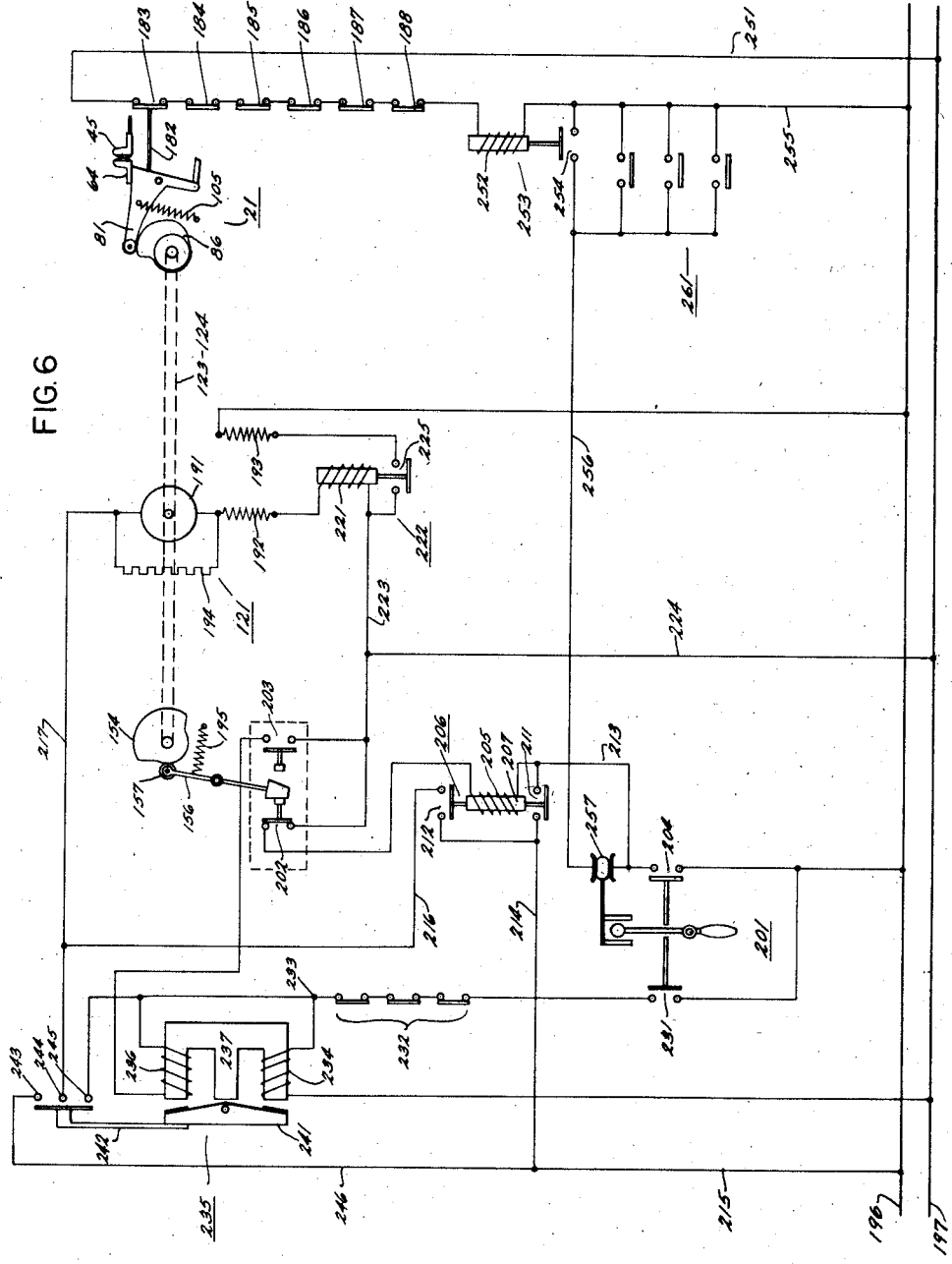

Patented Jan. 29, 1946

2,393,687

UNITED STATES PATENT OFFICE 2,393,687

MOTOR-OPERATED CIRCUIT BREAKER

Otto Jensen, Malvern, Pa., assignor to I. T. E. Circuit Breaker Company, Philadelphia, Pa., a corporation of Pennsylvania Application August 12, 1941, Serial No. 406,461

4 Claims. (Cl. 175—294)

My invention relates in general to electrical protective equipment and more particularly concerns a novel high-speed multipole circuit breaker and an electrical control system therefor.

The present invention involves the use of electrical protective equipment particularly adaptable to mercury arc rectifier circuits and is in the nature of an improvement over the copending application Serial Number 373,051 of Scott, filed January 3, 1941.

Generally, as described in the aforementioned application, the protection of mercury arc rectifier circuits requires the adaptation of the protective equipment to single phase faults. Thus in a polyphase mercury arc rectifier system, an electronic fault such as a back fire may cause extremely high values of current in the faulty anode circuit while the increase of current in the other phases will be relatively small.

It is obvious from mechanical principles that a single pole circuit breaker may be caused to open its contacts in less time than a multipole circuit breaker in which all the operating contacts are rigidly connected. Thus in the instance of the fault described for a mercury arc rectifier, it is particularly desirable in order to prevent excessive damage to the rectifier and the circuit to open a set of contacts in the faulty anode circuit in as short a time as possible after the inception of the fault and to cause the contacts in the other anode circuits to open immediately thereafter.

In the aforementioned patent application, a multi-pole circuit breaker was disclosed for particular application to mercury arc rectifier circuits. This circuit breaker consisted of a group of single pole interrupters, each independently responsive to fault current and each in a different phase of the power transformer feeding rectifier anodes. This group of interrupters was mounted upon a common frame and provided with pneumatic and mechanical operating mechanisms.

Thus the poles of the circuit breaker described could all be simultaneously closed and simultaneously opened. If a fault occurred in any particular anode circuit, its pole would immediately open its contacts and energize control means to cause the subsequent opening of the unaffected circuit breaker poles.

In the present application, the circuit breaker elements including the contacts, the arc quencher and the tripping unit are in all respects the same as in the above named application. However, the control system has been altered so that a motor may be utilized to cause the opening and closing of the circuit breaker contacts.

Thus the individual circuit breaker poles comprise a fixed contact and a complementary movable contact which is carried upon a pivoted arm. This arm may be rotated by a cam which is driven by an electric motor. The operating cam is driven progressively in one direction and during one part of a revolution causes the closing of the circuit breaker contacts and during another part of the revolution causes the opening of the circuit breaker contacts.

As in the earlier design, the movable contacts of the individual poles are provided with an automatic current responsive device which is operative to cause contact separation under the influence of springs independently of the position of the contact operating cam.

An electrical interlocking control circuit, utilizing control switches the contacts of which are closed and opened in accordance with the movement of the operating cams and each movable contact, is utilized to cause the opening of all circuit breaker poles immediately after the automatic operation of any one pole.

The electrical control system is provided with relays to prevent repeated closing upon a fault, with switching means to prevent closing when any of the rectifier auxiliaries are not in proper operation, and control switches which cause circuit breaker tripping when faults occur in the auxiliaries while the rectifier is in operation.

Accordingly it is an object of the present invention to provide a novel high speed automatic circuit interrupter.

Another object of my invention is to provide a multipole circuit breaker the poles of which are independently fault responsive and particularly adaptable to the protection of the anode circuits of mercury arc rectifiers.

Still another object of my invention is to provide a multipole circuit breaker having an electric motor for closing all of the circuit breaker contacts simultaneously and for opening all of the circuit breaker contacts simultaneously.

A further object of my invention is to provide a high speed multiple anode circuit breaker having a driving cam for each pole effective during a fraction of a revolution to cause closing of the circuit breaker contacts and effective during another fraction of a revolution to cause opening the contacts.

It is still a further object of my invention to provide a high speed circuit breaker particularly adaptable to the control of mercury arc rectifier circuits having a plurality of coupled cams, one for each pole for closing or opening the circuit breaker contacts and automatic means for each pole to open the contacts independently of the cam position.

Another object of my invention is to provide a mercury arc rectifier protective system including a circuit interrupter in each anode phase thereof and a control system for these anode breakers operative to cause tripping of all poles when a single pole has been automatically operated.

These and other objects of my invention will now become apparent from the following specification taken in connection with the accompanying drawings in which, Figure 1 is a side view of a six-pole circuit breaker illustrating the manner in which individual poles are assembled upon a common frame.

Figure 2 is a fragmentary cross sectional view of the contact operating shaft and illustrates the manner in which the contact operating cams are mounted and the manner in which the shaft is journalled.

Figure 2a is a side view of a contact operating cam.

Figure 6 is a schematic diagram of the multiple circuit breaker control system.

The individual circuit breaker poles are in most respects similar to those described in the aforementioned application. In Figure 1 the individual circuit breaker poles 21 are shown assembled into a single multipole unit upon a structural steel frame 22.

The six-poles illustrated are similar to each other and may be readily assembled upon the frame 22 and removed therefrom for servicing.

Figure 3:
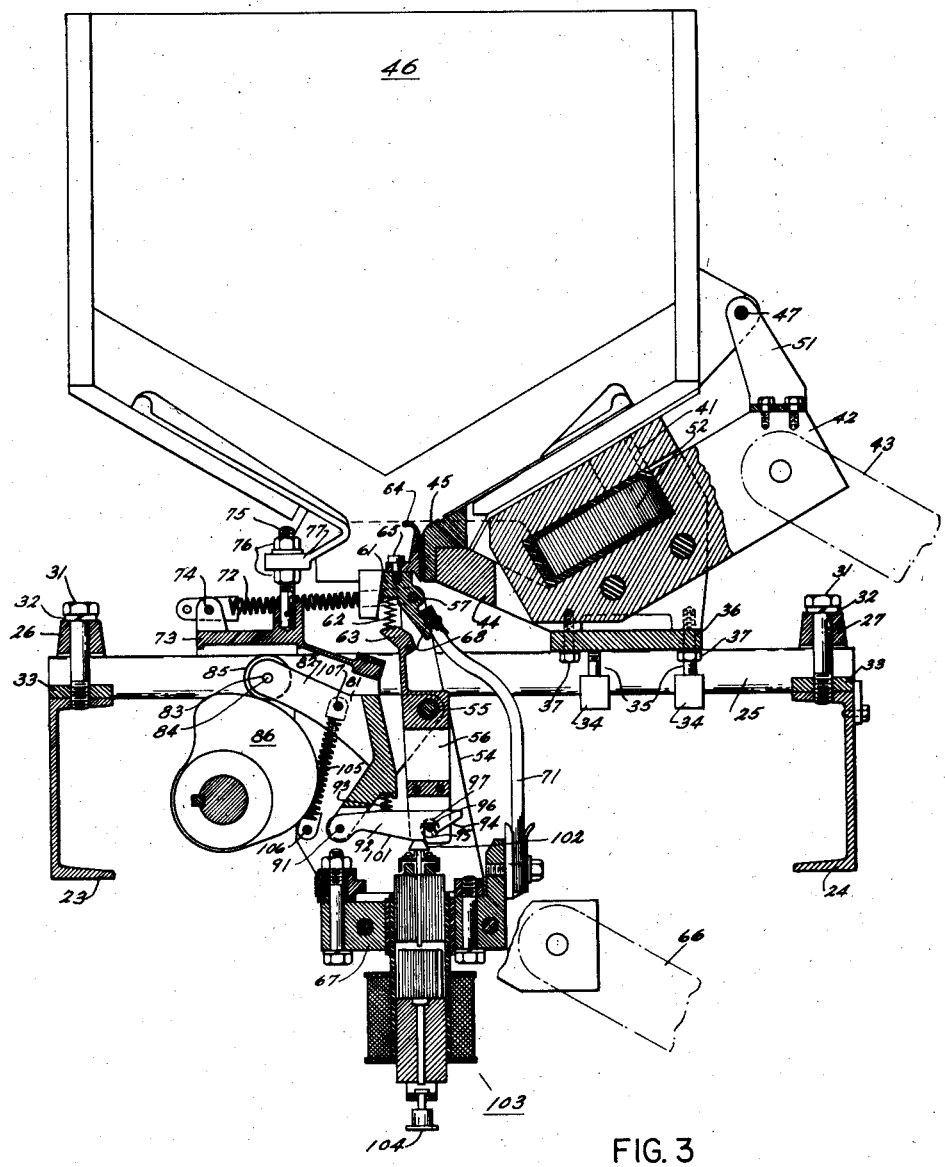
Figure 3 is an end cross sectional view of one of the circuit breaker poles mounted upon the frame as illustrated in Figure 1.

As illustrated in Figure 3, the structural steel frame 22 comprises the channels 23 and 24 which are spaced by suitable cross members at each end of the frame.

Each of the individual circuit breaker poles 21 is assembled in two distinct sections and secured to a pair of cross bars 25 as illustrated in Figures 1 and 3. These cross bars 25 are metallic members encased in a layer of insulation to isolate the two sections from each other and from the frame. The cross bars are secured to the channels 23 and 24 by a pair of clamping members 26 and 27 which as illustrated in Figure 1 bear down upon the ends of the cross bars 25. These clamps are held in position by the screws 31 and the lock washers 32. Locating plates 33 are welded to the frame and assure the proper spacing of the individual poles along the supporting channels 23 and 24.

Figure 4:
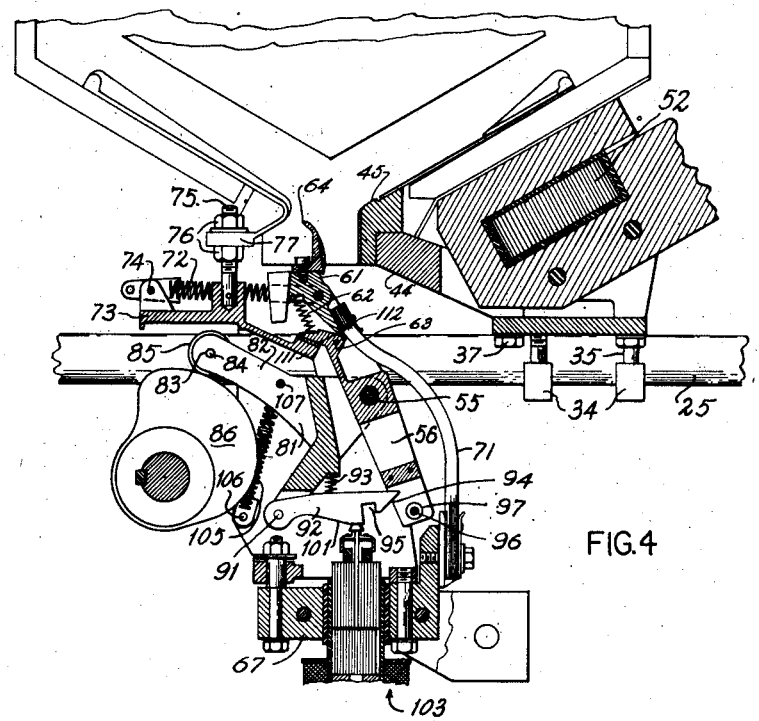
Figure 4 is a fragmentary cross sectional view of the circuit breaker pole illustrated in Figure 3 and illustrating the contacts in the opening circuit position immediately after automatic tripping.
Figure 5:
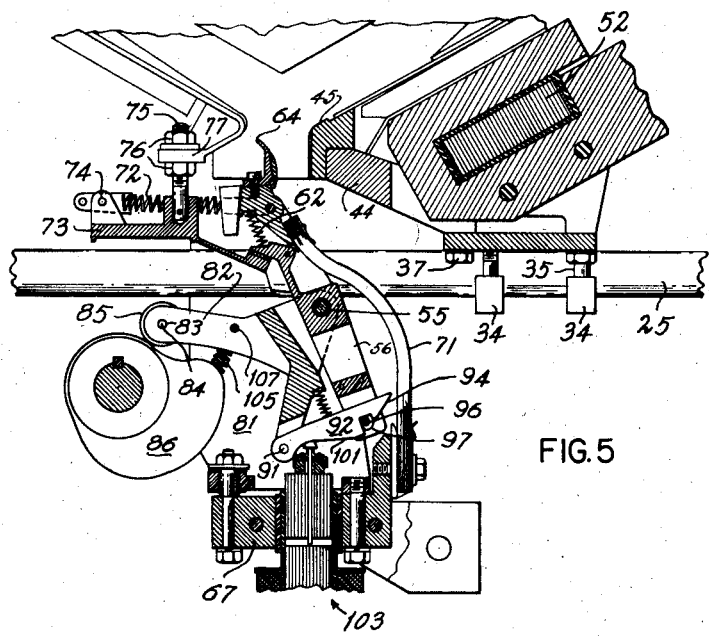
Figure 5 is a fragmentary cross sectional view corresponding to Figure 4 and illustrates the contacts in a position for reclosing.

Near one end of the cross bars 25, a plurality of clamping members 34 and screws 35 secure a plate 36 thereto. Secured to the plate 36 by a plurality of screws 27 is a conductive coil 41 which includes an integral extension 42 to which a conductor 43 may be readily secured. An oppositely disposed extension 44 provides a mount to which a stationary contact 45 may be secured as illustrated in Figures 3, 4 and 5.

An arc quencher 46 is pivotally supported upon a pin 47 which is carried by a bearing member 51 secured to the extension 42 of the coil 41. Thus the arc quencher 46 may be rotated from the position illustrated in Figure 3 about its pivot 47 to expose the contact structures and thus facilitate cleaning and replacement.

The particular nature of the arc quencher bears no relation to the present invention. A brief description of certain parts, however, may aid the reader in understanding the drawings. As illustrated the coil 41 surrounds a laminated magnetic member 52, the extensions 53 of which embrace the arc quencher 46 as illustrated in Figure 1.

Thus the magnetic members 53 are disposed on opposite sides of the arc quenchers 46 and accordingly a transverse magnetic field is established which during circuit interruption will tend to drive an arc up into the chute 46.

The extension 73 of the main circuit breaker supporting frame carries a stud 75 and cooperating nuts 76 which secure a lug 77 extending from the arc quencher structure 46. Thus to rotate the arc quencher about its pivot 47 the upper nut 76 must first be removed from stud 75.

The operating elements of this circuit interrupter are carried in a U-shaped frame 54 which is secured to the cross bars 25 by suitable clamping members as is more completely illustrated and described in the copending application. The walls of the U-shaped frame 54 are suitably drilled to carry a shaft 55 upon which a contact operating arm 56 is pivoted.

The contact arm 56 carries at its upper end a pin 57 upon which a contact carrying member 61 is rotatably supported and biased in a clockwise direction by compression spring 62. The compression spring 62 is retained between the contact carrying member 61 and an integral extension 63 of the contact carrying arm. The movable contact 64 is secured to the contact carrying member 61 by a plurality of screws 65 and accordingly contact 64 is normally biased by compression spring 62 towards the stationary contact 45. The movement caused by this bias is limited by the engagement of the extension 68, of the member 61, with web 63 of the contact arm.

Current is led to the movable contact 64 from a line conductor 66 through automatic trip coil 67 and through a flexible conductor 71 to an extension 68 of the contact carrying member 61.

The tripping coil 67 may comprise as illustrated a single turn of relatively heavy copper bar and the line conductor 66 and the flexible conductor 71 may be attached thereto by suitable bolts. Hence it may be seen that when the circuit breaker contacts are in the position illustrated in Figure 3, a circuit is completed from conductor 66 through the engaged contacts 64 and 44 to the line conductor 43.

The movable contact 64 is normally biased towards the open circuit position by a tension spring 72 which is secured to an extension 73 of the U-shaped frame. The force of spring 72 is transmitted to the contact 64 through pin 57 to which the spring is attached at one end while the other end of the spring is pivotally anchored to the extension 73 of the U-shaped frame by the pin 74.

An actuating arm 81 pivoted about the pin 55 controls the movement of the contact arm 56. The arm 81 comprises a main body section and an extension 82 which is drilled at 83 to carry a pin 84. Rotatably mounted upon this pin is a roller 85 which cooperates with controlling cam 86 to determine the position of the circuit breaker contacts as will hereinafter be described. The lower end 87 of the contact actuating arm 81 is notched and carries a pin 91 upon which a latch 92 is pivotally supported. The latch 92 is normally biased in a clockwise direction about the pin 91 by a small compression spring 93 contained in a recess of the arm 81.

The latch which controls the automatic tripping of the circuit breaker contacts is bevelled at 94 and contains a notch 95 in the lower surface thereof. The notch 95 is engageable with a pin 96 carried in ball bearings 97 that are secured in the contact operating arm 56.

In relation with the lower smooth surface 101 of the latch is a plunger 102 the motion of which is governed by the automatic tripping device 103. The automatic tripping device may comprise any current sensitive mechanism which will respond to predetermined currents flowing in the coil 67 to raise the plunger 102.

The plunger 102 may also be manually actuated by raising the knob 104.

Thus it may be seen that when the plunger 102 is raised as a result of an overcurrent or manual displacement of the knob 104, the latch 92 pivots in a counterclockwise direction about its supporting pin 91 and releases the pin 96. Under these circumstances, the contact carrying arm 56 will be freed from the control of the actuating arm 81 and will move under the influence of tension springs 72 to the open circuit position.

The actuating arm 81 is normally biased by tension spring 105 towards counterclockwise rotation about the pivot 55. The spring 105 is secured by the pin 106 at one end to the frame 54, and at the other end by pin 107 to the extension 82 of the contact actuating arm.

Under the influence of tension spring 105 it may be seen that the roller 85 will normally be biased into engagement with the curved surface of cam 86 and hence the rotation of actuating arm 81 about the pivot 55 will be governed by the rotation of the cam.

When the cam 86 is in the position illustrated in Figure 3, the roller 85 is in surface engagement with the highest portion of the cam and the contacts 64 and 45 are engaged as illustrated.

Should the latch 92 be released by the manual or automatic means provided, the contact carrying arm 56 will immediately be displaced to the position illustrated in Figure 4 under the influence of tension springs 72.

The movement of the contact carrying arm 56 about its pivot 55 under the influence of spring 72 is limited by a stop 111 which is surfaced with a layer of resilient material 112 such as rubber or the like. It may be seen also that when the contact carrying arm 56 is permitted to rotate freely under the influence of spring 72, movable contact 64 will be rotated in a clockwise manner about its pivot by the compression spring 62. This motion as previously mentioned is limited to the position where the extension 68 of the contact carrying member 61 engages the extension 63 of the contact carrying arm 56.

It may be seen from Figure 4 that immediately subsequent to automatic tripping, the contact carrying arm 56 will move to its full open position where as the contact actuating arm 81 and its associated latch 92 will remain in a fixed position.

Before the breaker can be reclosed the notch 95 in the latch must engage the pin 96 on the contact carrying arm 56. The latch must be moved to the right to accomplish this. Thus as illustrated in Figure 5, clockwise rotation of the cam, through an angle of approximately 90°, from the position of Figure 4 to that of Figure 5 will cause the contact actuating arm 81 to rotate under the influence of spring 105 and move its lower end 87 to the right carrying with it the pin 91 and latch 92. This movement will cause the chamfered surface 94 of the latch 92 to ride over the pin 96 and thus permit reengagement of the pin 96 and the notch 95.

Continued clockwise rotation of the cam 86 from the position illustrated in Figure 5 will then cause clockwise rotation of the actuating arm 81 and corresponding movement of the latch 92 and the contact carrying arm 56 about the shaft 55. This action will cause the reengagement of contacts 64 and 45 when the cam has rotated to the position illustrated in Figure 3.

Accordingly, it may be seen in the above discussion that when the circuit breaker is in the position illustrated in Figure 3, automatic or manual operation of the plunger 102, or 90° clockwise rotation of cam 86 will cause contact separation. Actuation of the cams will permit the simultaneous opening or closing of all of the poles.

As illustrated in Figure 1, a cam 86 is provided for each of the six circuit breaker poles and the six cams are suitably mounted upon a rotatable shaft which is driven by a motor 121. The motor 121 is carried upon brackets secured to the channels 23 and 24 of the circuit breaker frame.

The motor 121 is preferably a compound motor and drives the cam shaft through a speed reducer and coupling 122. The cam shaft is sectionalized and comprises the two sections 123 and 124 joined by a flexible coupling 125.

The individual shaft sections 123 and 124 are supported upon the main circuit breaker frame in bearings 126 which are carried upon transverse channel sections 127 as is more clearly illustrated in Figure 2. A bearing member 131 having tapped holes 132 is secured to the channel 127 by suitable screws 133 and lock washers 134.

A bore 135 in the bearing member 131 contains a loosely fitting bushing 136 of suitable bearing metal. This bushing 136 is maintained within a bore 135 by a screw 137 which passes through a tapped hole 141 in the bearing member 131 and enters a relatively large opening 142 in the bushing 136. The screw 137 is sufficiently short to provide clearance at 143 so that there is no tendency to bind the shaft 124.

Both the shafts 123 and 124, which are coupled at 125, are positioned against axial displacements by collars 144 which are slipped over the shafts and brought to bear against the sides of the bearing blocks 131. The collars 144 are then secured by set screws 145. These collars thus prevent longitudinal movement and so maintain the cams 86 in alignment with the rollers 85 of the individual poles.

The sections 123 and 124 of the cam shaft are coupled to each other by the loosely fitting cylindrical member 125 and by pins 146 and 147 which pass through holes 151 in the shaft sections and through corresponding holes 152 in the member 125. Cotter pins 153 prevent the accidental withdrawal of the pins 146 and 147. These pins are at right angles to each other and thus proper rotation of the shaft will be obtained even if the sections 123 and 124 are not in alignment.

The sectionalized shaft is provided since it is quite possible that during shipment or during installation upon a permanent foundation the main structural frame comprising channels 23 and 24 will be warped. Each section of the shaft is thus supported in two bearings 126 which due to the fact that the bearing sleeves 136 are loosely positioned automatically align themselves to compensate for distortion of the frame.

For the particular bearing shown in Figure 2, namely, the extreme right hand bearing of Figure 1, an additional element is employed, namely a cam 154. This cam is non-rotatably secured to the shaft 124 by means of a key 155 nested in corresponding key ways in each member.

An enclosed limit switch 162 is secured to the channel member 127. The pivoted switch arm 156 carries in its forked end a roller 157 biased against the surface of the cam 154. The enclosure contains contacts which are actuated when the cams 86 reach the positions of Figure 3 and Figure 5. The action of these contacts stops the motor.

The operating cams 86 for the individual circuit breaker poles illustrated in Figures 1, 2 and 2a are molded of high strength insulating material and comprise a hub 163 having a cylindrical bushing 164 embedded therein during the molding process.

The actuating cam itself is an irregularly shaped flange 165 extending from the molding. The bushing 164 contains a keyway 166 which, with a complementary keyway 167 in the shaft, cooperates with key 171 to prevent relative rotation. The cams 86 as illustrated in Figure 1 are spaced at equal intervals along the length of the shaft so that each cam surface 165 aligns itself with the roller 85 of the individual poles.

The key 171 serves to position each cam 86 at its proper angular position on the shaft. The key 171 and cam are fixed against axial movement by a pair of steel set screws 172 which pass through tapped holes in the hub 163 of the cam 86 and the bushing 164. These set screws 172 are relatively short and hence do not extend to the outer surface of the hub 163. As illustrated in Figure 2, the metallic set screws 172 are covered by a pair of screws 173 of an insulating material.

The outer surface of each of the shaft sections between the various cams is covered with a sleeve of insulating material 174, and accordingly the metal parts of the driving shaft are completely covered by insulating material in the vicinity of each of the circuit breaker poles.

Each of the cams 86 when mounted upon the shafts 123—124 are all secured thereto in the same relative angular position and hence it may be seen from Figures 1 and 3 that rotation of the shafts 123—124 by motor 121 will cause all of the circuit breaker contacts 64 to move simultaneously. Thus, if the contacts are initially in the position illustrated in Figure 3, rotation of the cam in a clockwise manner will cause all circuit breaker contacts to open and if rotation is then continued, all circuit breaker contacts will close.

Control means are provided to close all of the circuit breaker poles simultaneously or to open all of the poles simultaneously. The relays, which control the motor 121, shaft 123—124 and cams 86, are housed within the enclosure 181 which is secured to the channel sections 23 and 24 at one end of the circuit breaker frame as illustrated in Figure 1.

The enclosure 181 contains all the necessary relays for circuit breaker operation and a reference is now made to the schematic diagram Figure 6 which illustrates the electrical control system for the circuit breaker.

In Figure 6 a single circuit breaker pole 21 is illustrated in schematic form. Thus the fixed contact 45 is shown in engagement with the separable contact 64 which is positioned upon the actuating member 81 driven by the cam 86. The arm 81 is continuously biased by means of spring 105 towards the open circuit position and carries a switch operating lever 182 thereupon.

The actuating lever 81 and attached lever 182 (not shown in Figures 1–5) control the operation of a switch having contacts 183. Six switches 183—188, one for each pole, are illustrated, and are connected in series for reasons which will hereinafter be explained.

The cam 86 positioned upon the shaft 123—124 is driven in a clockwise direction by motor armature 191 which is coupled thereto through a speed reducing mechanism.

The electric motor 121 is preferably a compound motor including a series field 192 and a shunt field 193. The armature 191 is shunted by a resistor 194 to provide dynamic braking.

Although not illustrated in Figure 6, the six cams 86 are all mounted upon the shaft 123—124 and rotate in unison. The limit switch control cam 154 is also diagrammatically illustrated in Figure 6 and as shown controls the movement of an arm 156 which is biased by spring 195 towards engagement with the cam surface.

The opposite end of arm 156 actuates the limit switch 162 which is supported as illustrated in Figure 2. The electrical control circuits of Figure 6 are energized from a suitable low voltage direct current source schematically illustrated as the control bus bars 196 and 197.

As illustrated in Figure 6, the circuit breaker poles are all in the closed circuit position and hence the contacts 64 and 45 are engaged and the switches 183—188 are closed. Also contacts 202 of the limit switch 162 are closed and contacts 203 of the limit switch are opened. The position of contacts 202 and 203 is determined of course by the position of the cam follower 157 upon the cam 154.

When it is desired to open the circuit breaker the handle of the control switch 201 is moved to the left to close contacts 204. The closure of these contacts will complete a circuit from the control bus 196 through contacts 204 through the operating coil 205 of the tripping relay 206 and through closed contacts 202, and conductor 224 and to the control bus 197.

This will immediately energize the coil 205 and relay plunger 207 will rise as viewed in Figure 6 to close its contacts 211 and 212. It may be seen that the closure of contacts 211 will complete a circuit which extends through conductors 215, 214, contacts 211, coil 205, contacts 202 and conductor 224 which short circuits contacts 204, and hence even though the control switch handle may be moved momentarily, the movement of plunger 207 will serve to maintain the coil 205 of the tripping relay in the energized state. This seals in the relay so that the circuit breaker opening operations may not be interrupted, once initiated.

The closure of contacts 212 of the tripping relay 206 will complete a circuit from the bus bar 196 through wires 215, 214, 216, 217 through motor armature 191, the series field 192, coil 221 of the shunt field relay 222 through wires 223 and 224 to the bus 197.

The coil 221 of the shunt field relay 222 is a comparatively low resistance winding since it is necessary that this coil carry the full armature current of the motor 121. Thus immediately upon closure of contacts 204, it may be seen that the motor 121 will be energized and cause cams 86 and 154 to rotate in a clockwise direction.

Upon initiation of current flow through the motor armature 191, the relay coil 221 is energized as previously mentioned and thus closes contacts 225. This places the shunt field 193 of the motor 121 directly across the control bus bars 196 and 197. Rotation in this manner will permit spring 105 to rotate lever 81 and thus separate all of the contacts 64 and 45, while simultaneously opening switch contacts 183 to 188. Also rotation of shaft 123—124 will open contacts 202 of limit switch 162 and close contacts 203 thereof.

The operation of the limit switch 162 occurs at the moment when the contacts are in the position illustrated in Figure 5, that is, when the contacts are in their fully separated position. At the instant that contacts 202 separate, the coil 205 of the tripping relay 206 is deenergized and thus the plunger 207 moves to the position indicated in Figure 6. This in turn causes the separation of contacts 212 and the deenergization of the motor circuit including armature 191, series coil 192, and shunt field relay coil 221.

In order to ensure a dynamic braking effect, the relay 222 is arranged to open its contacts 225 somewhat after the motor circuit is deenergized by the opening of contacts 212. This time delay permits the shunt field 193 to remain energized when the armature 191 is deenergized. The shunt magnetic field will thus cause the generation of relatively large currents which when flowing through resistor 194 will provide the braking action and effectively prevent drift of the cam shaft.

On the other hand, relay 222 is arranged so that when energized upon the closure of contacts 212, its contacts 225 close immediately. This permits the motor armature 191 to speed up at a relatively rapid rate.

The resistance 194 functions in addition to producing the dynamic braking effect to reduce the arcing which would normally occur at the contacts 212 as a result of the highly inductive circuit interrupted.

When the circuit interrupter is in the open circuit position, the contacts 203 of the limit switch 162 are closed and the contacts 183—188 are open. To close all of the circuit breaker poles simultaneously, the handle of the control switch 201 is moved to the right and accordingly contacts 231 close.

This action completes a circuit from the control bus 196 through closed contacts 231 through a plurality of normally closed contacts 232 to a junction 233. From the junction 233 two circuits are completed. The first circuit is through a coil 234 of the closing relay 235 to the control bus 197. The other circuit from the junction 233 is through coil 236 of the relay 235 through the now closed contacts 203 to the bus 197.

Hence it may be seen that upon the initiation of the closing operation, both coils 234 and 236 of the closing relay 235 are energized. The closing relay 235 comprises an E-shaped magnet 237, the outer legs of which carry the coils 234 and 236. A centrally pivoted magnetic member 241 is arranged so that its ends are normally under the influence of magnetic fields produced by both of the coils 234 and 236.

Coil 236 is arranged to produce a stronger magnetic field than coil 234 and hence since these coils are simultaneously energized, coil 236 will predominate and the magnetic member 241 will rotate in a clockwise direction against the pole piece upon which the coil 236 is wound.

Attached to the magnetic member 241 is a contact operating arm 242 which when operated as previously described closes contacts 243, 244, 245.

The closure of contacts 243 and 245 will extend a circuit from conductor 196 through wires 215, 246, closed contacts 243 and 245, to the coil 236 thus bypassing the circuit extension of conductor 196 through contact 231 to coil 236.

Hence the momentary initiation of the closing operation will cause the sealing in of the closing contacts to complete the closing operation even if the operator releases the closing handle of switch 201. The closure of contacts 243 and 244 will complete an additional circuit from the control bus 196 through the motor armature 191 and through the relay coil 221 to the control bus 197. Accordingly, the contacts 225 of relay 222 will close and the motor armature 191 will rotate to bring the contacts 64 and 45 of each pole from the position indicated in Figure 5 to the position indicated in Figure 3.

When this contact closure occurs, the cam 154 and its associated limit switch 162 will operate to close contacts 202 and open contacts 203. The opening of contacts 203 will immediately deenergize the relay coil 236 and hence the magnetic member 241 will be drawn against the pole piece containing the coil 234 if this coil is still energized by the closure of contacts 231.

If contacts 231 are opened at this time, the magnetic member 241 will spring back to its normal central position as indicated in Figure 6. If these contacts are not opened, the magnetic member 241 will remain in contact with the pole upon which coil 234 is wound, even if coil 236 is subsequently reenergized.

Thus should any one of the circuit breakers trip automatically while the contact 231 is still closed due to a previous closing operation, the relay winding 234 will hold the armature 241 against its pole face and even though the relay winding 236 is again energized it will be ineffective to operate the armature 241. In order to operate the armature 241 it is necessary for the operator first to operate the handle 201 to disengage the contacts 231, resulting in a deenergization of the relay 234. This will result in the armature 241 being restored to its neutral position as shown in Figure 6 and if, thereafter, the operator then again recloses the contacts 231, a closing operation cycle as described hereinbefore will be completed. Therefore, it may be seen that the provision of the coil 234 will prevent reclosing if contacts 231 are still closed and hence prevent repeated contact opening and closing on a faulty circuit.

The separation of contacts 243 and 244 disconnects the motor 121 from the control bus although the shunt field 193 is still energized by the time delay in relay 222. Accordingly the dynamic braking effect previously mentioned will again be effective and the motor will stop in a relatively short time.

Thus the contacts will be maintained in the closed circuit position illustrated in Figure 3. The auxiliary switches 183—188 one of which is provided on each of the circuit breaker poles are closed when the associated contacts 64 and 45 are engaged and open immediately when these contacts are disengaged. Each of these switches are arranged in series in a circuit from the control bus 197 through wire 251 through the switches 183—188 and through coil 252 of a relay 253 to the control bus 196.

Thus when all of the main circuit breaker contacts are in the closed position, the relay coil 252 is energized and thus maintains contacts 254 open. Accordingly, should a fault occur in one of the individual circuit breaker poles illustrated in Figure 1 to cause the operation of its automatic current responsive device 103, its contacts 64 and 45 will separate and open one of the switches 183—188.

This will deenergize relay coil 252 and the contacts 254 will close. The closure of contacts 254 will energize a circuit from control bus 196 through wire 255 through contacts 254 through wire 256, through normally closed contacts 257 of a switch which will be described in a later paragraph, through wire 213 through tripping relay coil 205, through normally closed contacts 202 and through wire 224 to the control bus 197.

The completion of this circuit will cause the energization of tripping relay 206 and will cause the rotation of cam shaft 123—124 to open all of the circuit breaker poles in the manner previously described.

It is to be noted that the circuit breaker pole which initiated this last mentioned operation will open under the influence of springs 72 and hence will open independently of the operation of the remainder of the circuit breaker poles. However, the immediately subsequent operation, that is, the rotation of all cams 86 to open all of the circuit breaker poles will place all contacts including those of the automatically operated pole into the position indicated in Figure 5 which is that necessary for immediate reclosing, if desired.

The switches 183—188 close as previously mentioned during the final closing movement of contacts 45 and 64 and thus the coil 252 of relay 253 is energized when the main contacts are already closed. Therefore, the contacts 254 will be closed at the moment of circuit completion and hence would tend to energize the tripping relay 206 to reopen the main contacts 45 and 64.

In order to preclude this immediate tripping action, the contacts 257 have been included in the control switch 201. It may be seen from Figure 6 that when the closing operation is initiated by displacing the handle of control switch 201 to the right, the lever arm thereof opens contacts 257. Since contacts 257 are in the tripping relay circuit, the opening thereof will preclude the tripping of the circuit breaker poles as the main contacts of each pole engage.

Of course an instant after the engagement of all main contacts 45 and 64, the coil 252 will be energized and contacts 254 opened. Thus, when the control handle is released and assumes the neutral position indicated in Figure 6, the contacts 257 will close and place the tripping relay in operative relation in the control circuit.

The disconnection of the tripping relay circuit by the opening of contacts 257 during circuit closure in no way affects the automatic operation or the various safety features included in the novel control circuit illustrated, even if the circuit breaker contacts are closed under faulty conditions.

This is a result of the fact that each of the circuit breaker poles has a current responsive device 103 included thereupon and hence should the contacts be closed upon a fault the latch 92 will be raised to release the contact carrying arm which will accordingly open under the influence of tension springs 72.

It is obvious that when the handle 201 of the control relay is allowed to assume its neutral position, contacts 257 will close, and if any of the circuit breaker poles have opened, will complete circuits to cause rotation of the cam shaft 123—124 to place all of the poles in the position indicated in Figure 5 for reclosing.

If the multi-pole circuit breaker illustrated and its associated control system are employed for the protection of mercury arc rectifier anode circuits, then various other safety features may be incorporated.

In the operation of mercury arc rectifiers there are auxiliaries which are usually necessary for satisfactory performance. These auxiliaries include cooling water systems, ignition equipment, grid circuits for the control of current flow and the like. This apparatus may be provided with devices responsive to the various operating conditions to indicate that they are in proper working order.

The contacts 232 connected in series in the closing circuit of the control system represent switches which are included in the aforementioned responsive devices and which will open their contacts under faulty conditions. Thus, for example, if a pressure gauge indicates an improper working condition, one of the switches 232 will open. It may be seen in view of the above discussion, that if anyone of the contacts 232 are open, an attempt to close the main contacts by moving the handle of control switch 201 to the right will fail inasmuch as contacts 232 are in the circuit leading to the coils of the relay 235.

In a similar manner the auxiliary apparatus used with mercury arc rectifiers may fail during operation. Switches 261 having contacts in parallel with contacts 254 represent switches on these auxiliaries which will close their contacts upon failure of the apparatus.

The closure of any one of contacts 261 will affect the circuit breaker system in a manner similar to that previously described in connection with a closure of contacts 254, that is, a tripping of all of the circuit breaker poles.

Thus the circuit breaker control system illustrated provides novel means whereby failure of any of the rectifier auxiliaries will preclude closure of the main contacts or will cause immediate circiut interruption if the main contacts have been closed. If the circuit breaker poles are employed for protection of anode circuits of a rectifier, one of the contacts 261 may be an interlocking contact upon circuit interrupters in the cathode circuit or in the transformer circuits. Thus interruption of any of these circuit breakers would cause closure of one of contacts 261 and consequent interruption of the anode circuits.

The control system herein illustrated may of course be applied to various installations, other than mercury arc rectifier circuits. Thus the system illustrated may be applied to any polyphase circuit wherein it is desirable to permit a single pole to open its contacts at high speed and prior to the interruption of the associated poles.

Similarly, the individual circuit breaker pole illustrated in Figures 1 through 5 and the mechanical means for closing and opening the circuit breaker pole may be applied to any particular circuit.

Thus, although I have presented many specific disclosures in the above specification, I prefer to be bound by the scope of the appended claims.

I claim:

1. In a circuit breaker for controlling a circuit; a fixed contact; a movable contact normally urged to disengaged position with respect to said fixed contact; a rotatable cam; a link mechanism connected between said cam and said movable contact for operating said contact to closed and open position under the control of said rotating cam; said cam having a closing position in which it moves said link to close said contacts and having an opening position in which said link mechanism operates said movable contact to open position; means responsive to electrical conditions of the circuit controlled by said circuit breaker for disengaging said cam from said movable contact and operating said movable contact to tripped position with said cam in its closing position; and means responsive to the tripping of said circuit breaker for operating said cam to its open position.

2. In a circuit breaker for controlling a circuit; a fixed contact; a movable contact normally urged to disengaged position with respect to said fixed contact; a rotatable cam; a link mechanism connected between said cam and said movable contact for operating said contact to closed and open position under the control of said rotating cam; said cam having a closing position in which it moves said link to close said contacts and having an opening position in which said link mechanism operates said movable contact to open position; means responsive to electrical conditions of the circuit controlled by said circuit breaker for disengaging said cam from said movable contact and operating said movable contact to open position with said cam in its closing position; means responsive to the tripping of said circuit breaker for operating said cam to its opening position; and means operative when said cam is in its opening position for re-engaging said cam with said movable contact whereby said cam upon further operation to its closing position operates said movable contact to its closing position.

3. In a circuit breaker for controlling a circuit, a fixed contact; a movable contact normally urged to disengaged position with respect to said fixed contact; an electric motor driven means; link mechanism between said motor driven means and said movable contact for transferring motive power from said motor driven means to said movable contact for operating said contact against its normal urge into engagement with said fixed contact, said link mechanism including a latching means for maintaining said link mechanism operative to transmit power from said motor driven means to said movable contact; means responsive to electrical conditions of said circuit for tripping said latching means to render said link mechanism ineffective to transmit power from said motor driven means to said movable contact; said motor driven means being applicable for re-engaging said latching means to again render said link mechanism effective for transmitting motive power from said motor to said movable contact.

4. In a circuit breaker; a fixed contact, a movable contact for engaging and disengaging said fixed contact; a source of motive power; means including said source of motive power and a cam driven by said source of motive power and link mechanism driven by said cam and connecting said cam to said contacts for operating said contacts into engagement; said means being also operative to operate said contacts into disengagement; means operative upon the operation of said contacts into engagement for terminating the operation of said source of power; said means being also operative upon the operation of said contacts into disengagement for terminating the operation of said source of power; and means responsive to predetermined circuit conditions for disengaging said cam from said contacts to permit said contacts to disengage; said first mentioned means being operable to reconnect said contacts and for operating said contacts into engagement.

OTTO JENSEN.